Jan. 10, 1956  A. P. CELILLO  2,729,848
POULTRY GIZZARD OPENER
Filed Oct. 6, 1953
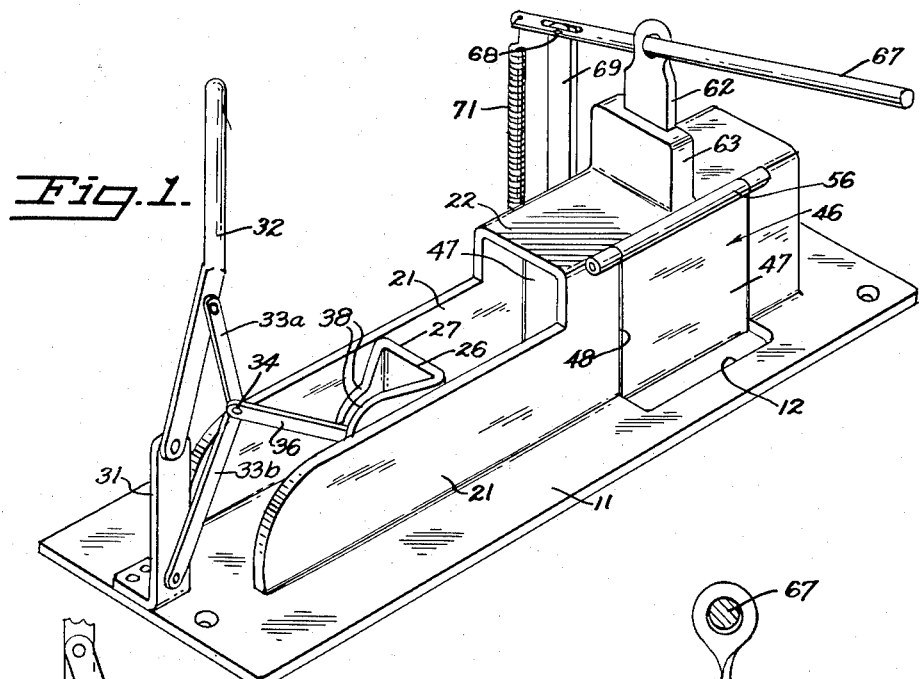
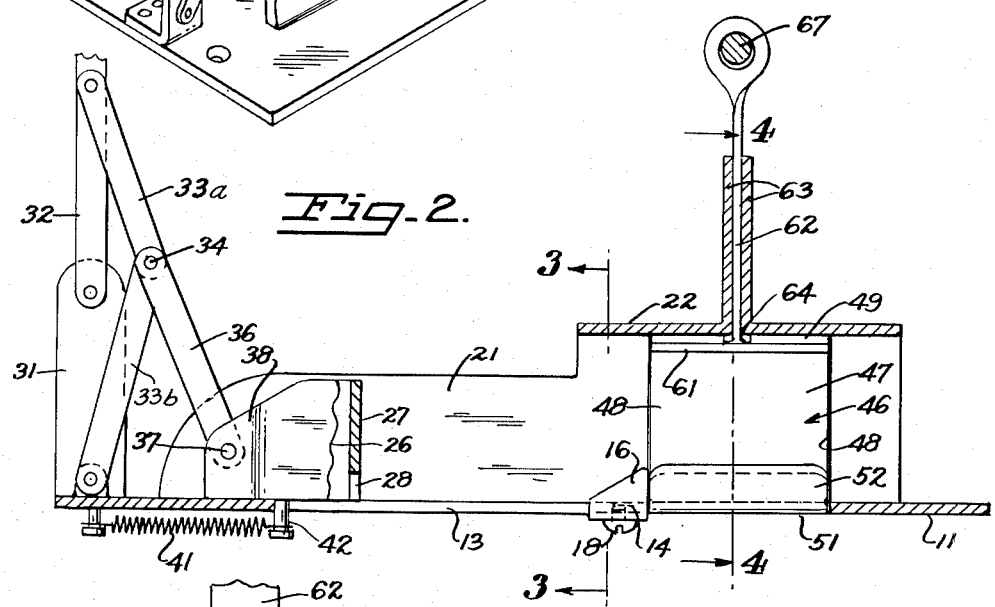
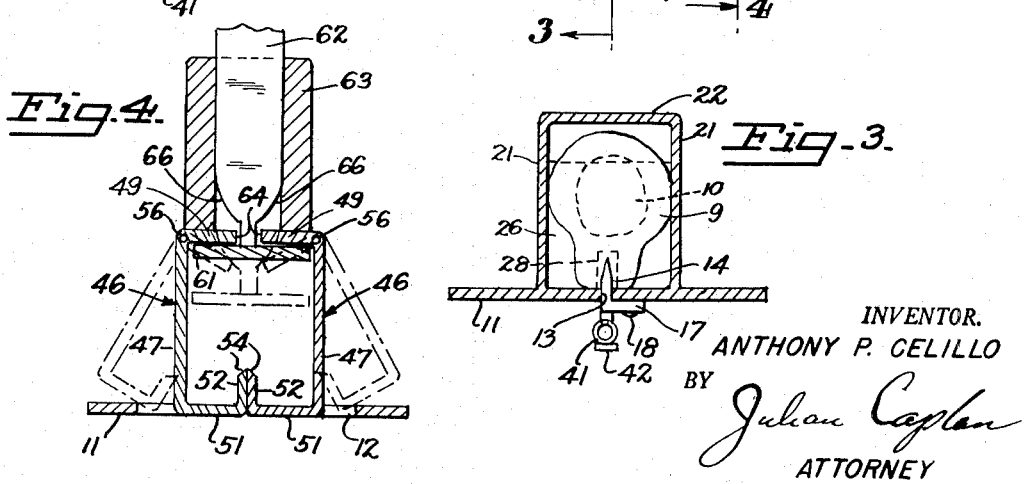
INVENTOR.
ANTHONY P. CELILLO
BY
Julian Caplan
ATTORNEY United States Patent Office 2,729,848
Patented Jan. 10, 1956

2,729,848
POULTRY GIZZARD OPENER
Anthony P. Celillo, San Francisco, Calif.
Application October 6, 1953, Serial No. 384,409
6 Claims. (Cl. 17—11)

This invention relates to new and useful improvements in poultry gizzard opener.

It is common practice in dressing poultry to present to the consumer all of the edible organs of the poultry, including the gizzard. However, the gizzard contains in its interior a lining sac which is entirely inedible and hence, in trimming poultry, it is necessary to remove the lining sac from the interior of the gizzard and preserve only the flesh surrounding the sac. One manifestation of the present invention provides a device whereby mechanical means is provided for performing the difficult and time-consuming task of removal of the lining sac from the gizzard.

One of the objects of this invention is to provide a device which will slit the edible flesh of the gizzard without rupturing the lining sac, then spread apart the severed sides of the gizzard while pressing down from above on the sac thereby pushing the sac intact away from the surrounding flesh and separating the edible from the inedible portions of the organ.

The apparatus hereinafter described therefore provides means for slitting the gizzard at the precise location and at the required depth to sever the flesh below the sac without opening the sac and thereafter immediately to apply force to spread apart the severed edges of the gizzard and at the same time to push down on the gizzard from above, the combined effort of which motions is to push the sac from the surrounding flesh so that it may drop into a receptacle whereas the edible flesh of the gizzard is separated and may be placed in a different receptacle.

The gizzard is an irregularly shaped organ which is the second stomach of poultry. At its widest point, which is termed herein the top of the gizzard, it is approximately an inch and a quarter deep and about two inches long, it being understood that the exact dimensions of a gizzard depend upon the age of the fowl. An inedible lining sac is located inside the thick, fleshy top part of the gizzard very close to the top edge thereof, the lower edge of the sac being spaced well above the lower edge of the gizzard. At least one-half inch of flesh exists between the bottom of the sac and the bottom of the gizzard. There is an edible membrane surrounding the sac which is more intimately associated with the flesh of the gizzard than with the sac and hence when the gizzard is ripped apart, as hereinafter described, the membrane tends to cleave to the flesh rather than to the sac thereby permitting the sac to drop out of engagement with the gizzard upon successful operation of the device hereinafter described.

In essence the operation of the device hereinafter described comprises forming a slit in the flesh of the gizzard from the bottom edge almost up to, but not into, the sac so that the sac remains intact. After the slit is made the entire length of the gizzard, the edges or lips of the slit are pulled apart while at the same time pressure is applied to the top of the gizzard and hence to the top of the sac. The combination of these two movements is to move the flesh of the gizzard away from the sac and push the sac down out through the slit. Thus, the lining sac is removed without rupturing the same and the inedible and edible portions of the gizzard are separated.

Essentially the same structure used to remove the lining sac from the gizzard may be employed in larger scale for splitting chickens and spreading them apart to facilitate the removal of the viscera in the processing of eviscerated poultry. In this adaptation of the invention, the poultry is placed in the machine in such manner that the carcass is sliced along the back-bone of the fowl providing access to the abdominal cavity. The carcass is then spread apart while pressure is applied at the breast-bone thereby providing access to the interior for processing.

Other objects of the present invention will become apparent upon reading the following specification and referring to the accompanying drawings in which similar characters of reference represent corresponding parts in each of the several views.

In the drawings:

Fig. 1 is a perspective of the device.

Fig. 2 is a longitudinal vertical midsection thereof.

Fig. 3 is a transverse vertical section taken substantially along the line 3—3 of Fig. 2.

Fig. 4 is a transverse vertical section taken substantially along the line 4—4 of Fig. 2.

The present device is mounted on a horizontal, substantially rectangular base plate 11. The plate and the other portions of the apparatus hereinafter described are desirably formed of stainless steel or other metal which will not corrode and which can easily be cleaned at the end of the operation. Adjacent the front of the base plate 11 is a substantially rectangular aperture 12 the length of which is slightly greater than the length of the gizzard 9 and which is greater in its transverse dimension than in its longitudinal dimension. It is through this aperture that the lining sac 10 falls at the completion of the operation.

Immediately in front of the large aperture 12 is a central forwardly extending narrow slit 13. A knife blade 14 having its cutting edge 16 facing forwardly extends up from the bottom of plate 11 through the slit 13 adjacent aperture 12 and projects above the level of the base plate 11 about one-half inch, which is the thickness of the flesh below the lining sac 10. In order to facilitate sharpening of the knife edge, the knife 14 may be detachably connected to the base plate 11 by bending an offset 17 on the lower end of the knife transversely horizontally and attaching the same to the base plate by means of a screw 18.

Extending vertically up from the base plate 11 are vertical sides 21 which are spaced apart about the width of the gizzard and extend up from the base plate a distance about equal to the thickness of the gizzard. The knife blade 14 thus is positioned centrally between the sides 21. A top 22 connects the sides from a location ahead of knife 14 and above and rearwardly beyond aperture 12. The elevation of top 22 is greater than the height of the gizzard in order to accommodate additional parts hereinafter set forth.

A horizontally movable pusher 26 having a transverse rearward face 27 which is formed with a slot 28 along its bottom edge at the center thereof is provided to push a gizzard 9 rearwardly between the sides 21 so that it is sliced by the knife 14 in the proper location. The slot 28 is positioned and dimensioned so that face 27 of pusher 26 may pass over the knife 14.

Various means may be employed to provide a horizontal rearward movement to the pusher, one such means being herein illustrated as comprising a vertical bracket 31 attached to base plate 11 to the upper end of which is pivotally mounted a handle 32. A pair of pivoted toggle levers 33a and b are joined together at one end by pin 34, the opposite end of one of the toggle levers 33b being pivotally attached to the bracket 31 adjacent its lower end and the other toggle lever 33a being pivotally attached at its opposite end to the handle 32. The pin 34 which passes through the ends of the toggle levers 33a and b together also passes through to the front end of actuating lever 36 the rearward end of which is pivotally connected by pin 37 to inward offsets 38 at the rearward end of the pusher 26. Thus, as the handle 32 is depressed, the pusher member 26 is moved rearwardly. Depression of handle 32 may be accomplished by other means. The gizzard 9 placed behind the pusher 26 is pushed over the knife 14 which slits upwardly from the bottom edge of the gizzard 9 to a line slightly below the sac 10. Spring 41 beneath plate 11 is fixed at one end to plate 11 and at its opposite end to pin 42 on pusher 26 which extends down through slot 13. Spring 41 thus functions to retract pusher 26 after the gizzard has been slit.

Immediately rearwardly of knife 14 and above the aperture 12 in the base plate 11 a pair of wings 46 as positioned. The wings 46 have a length equal to the length of the aperture 12 which is in turn slightly greater than the length of a gizzard and are irregular in shape having vertically extending sides 47 which are approximately as high as the side members 21 over the aperture 12 and of a length slightly less than the length of aperture 12. Sides 21 are cut away as indicated by reference numeral 48 to permit inward and outward movement of wings 46. Extending inwardly from the upper edges of sides 47 are top members 49 which also serve as cam followers. Extending inwardly from the bottom edges of the sides 47 are bottom members 51, the inner abutting edges of which are bent upwardly in vertical spreaders 52 to a height equal to the height of the knife 14. After a gizzard has been slit by knife 14, the rearward movement of the gizzard causes the spreaders 52 to fit into the slit formed by the knife, the upper edges 54 being bevelled to facilitate the function. The wing members are hinged to the top 22 by means of hinges 56 attached to the upper edges of side members 47.

Below the top members 49 of the wings 46 is a vertically moving plunger 61 and this plunger is connected to the lower end of vertical actuating arm 62 which projects up through the top 22 and is confined to vertical movement by means of guide 63, the inner extremities of the top portions 49 of the wings being formed with slots 64 for passage of the arm 62. The actuating member 62 is narrow at its lower end and then widens out a short distance above its lower end to form cams 66 so that as the actuating arm 62 is depressed it not only pushes the plunger 61 downwardly but also depresses the top members 49 or cam followers causing the wings 46 to pivot outwardly about the hinges 56. The movement of the actuating arm 62 is occasioned by handle 67 to which the actuating arm 62 is slidably connected, the handle being pivotally attached by pin 68 to the upper end of the vertical bracket 69, the lower end of which is attached to the base plate 11. Handle 67 is depressed manually, or by other means, and this depresses plunger 61, putting pressure on the upper edge of the gizzard 9 above the lining sac 10. At the same time the widened cam portions 66 of the actuating lever 62 cause the wings 46 to pivot apart, which spreads the lips of the slit of the gizzard apart and tends to rip the flesh from the lining sac at the same time that the sac itself is being depressed. The combination of the two movements is to force the sac out of the opening formed in the lower end of the gizzard, the sac 10 dropping through the aperture 12 into a container and the edible flesh of the gizzard being returned to normal position upon retraction of the wings 46. Springs 71 connected to handle 67 returns the handle 67, arm 62, plunger 61, and wings 46 to normal position. The next gizzard in line as it is moved rearward by pusher 26 pushes the trimmed gizzard rearwardly and into a separate container.

As has heretofore been stated, apparatus constructed essentially along the same lines as heretofore described may be used in the processing of poultry. The machine is built large enough to accommodate whole fowl and the fowl are placed between the sides 21 and moved forwardly by the pusher 26, the knife 14 cutting along the back-bone of the fowl and providing access to the interior. The wings 46 are employed to pull the flanks of the poultry apart while the plunger 61 pushes downwardly against the breast of the fowl. This results in the viscera being exposed so that the same may be removed conveniently.

Although I have described my invention in some detail by way of illustration and example for purposes of clarity of understanding, it is understood that certain changes and modifications may be practiced within the spirit of the invention and scope of the appended claims.

What is claimed is:

1. A poultry trimming device for objects slit along one edge having internal inedible organs comprising a frame having at least one open end, an opening in the bottom, a substantially closed top, and sides formed with openings therein; a pair of wings hinged to said frame, each said wing having a side fitting within and substantially closing the opening in said frame side, hinged means hinging the top edge of said wing side to the juncture of the frame top and frame side, an inwardly extending bottom member at least partially enclosing the opening in said frame bottom extending inwardly along the bottom edge of said wing side, and an upwardly extending spreader along the inner edge of said bottom arranged to fit within the slit in said object and means for moving said wings outwardly above said hinged means to expose the interior of said object.

2. A trimming device according to claim 1 which further comprises a plunger slidably mounted on said frame arranged to fit on top of said object and means for depressing said plunger as said wings are moved outwardly to eject organs from the interior of said object.

3. A device according to claim 1 which further comprises an inwardly extending top member along the top edge of each said side of said wings, an actuating arm, a guide on said frame for said arm for reciprocatory movement of said arm, a plunger on the lower end of said actuating arm below said top members, a cam on said actuating arm arranged to engage said top members as said arm is depressed to move said wings outwardly upon downward movement of said arm, said plunger ejecting organs from the interior of said object as said wings widen said slit and expose said organs in the interior of said object.

4. A poultry trimming device for objects having external inedible organs comprising a frame, a base on said frame, sides on said frame extending forward on said base, a knife supported by said frame projecting above said base between said sides, a pusher mounted on said frame for rearward movement between said sides to push said object rearwardly, said knife forming a slit in said object as it is pushed rearwardly by said pusher, a pair of wings hinged to said frame, each said wing having a side, hinge means on the top of said side for connection to said frame an inwardly extending bottom member along the bottom edges of said side, and an upwardly extending spreader along the inner edges of said bottom behind said knife arranged to fit within the slit in said object, and means for moving said wings outwardly about said hinge means to expose the interior of said object.

5. A trimming device according to claim 4 which further comprises a plunger slidably mounted on said frame arranged to fit on top of said object and means for depressing said plunger as said wings are moved outwardly to eject organs from the interior of said object.

6. A device according to claim 4 which further comprises an inwardly extending top member along the top edge of each said side of said wings, an actuating arm, a guide on said frame for said arm for reciprocatory movement of said arm, a plunger on the lower end of said actuating arm below said top members, a cam on said actuating arm arranged to engage said top members as said arm is depressed to move said wings outwardly upon downward movement of said arm, said plunger ejecting organs from the interior of said object as said wings widen said slit and expose said organs in the interior of said object.

References Cited in the file of this patent

UNITED STATES PATENTS

| | | |
|---|---|---|
| 575,886 | Harrison | Jan. 26, 1897 |
| 2,076,440 | Amon | Apr. 6, 1937 |
| 2,403,516 | Gaddini | July 9, 1946 |
| 2,455,675 | Hawk | Dec. 7, 1948 |
| 2,531,927 | Waters | Nov. 28, 1950 |
| 2,663,899 | Biddinger et al. | Dec. 29, 1953 |
| 2,677,403 | Brown et al. | May 4, 1954 |